(12) United States Patent
Zhang et al.

(10) Patent No.: US 12,002,134 B2
(45) Date of Patent: Jun. 4, 2024

(54) AUTOMATED FLOW CHART GENERATION AND VISUALIZATION SYSTEM

(71) Applicant: PwC Product Sales LLC, New York, NY (US)

(72) Inventors: Yizhuo Zhang, Shanghai (CN); Jun Li, Shanghai (CN); Weigang Li, Shanghai (CN); Shawni Chen, Shanghai (CN)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 17/278,100

(22) PCT Filed: Jan. 8, 2021

(86) PCT No.: PCT/CN2021/070926
§ 371 (c)(1),
(2) Date: Mar. 19, 2021

(87) PCT Pub. No.: WO2022/147780
PCT Pub. Date: Jul. 14, 2022

(65) Prior Publication Data
US 2023/0343002 A1    Oct. 26, 2023

(51) Int. Cl.
*G06T 11/20* (2006.01)
*G06T 11/60* (2006.01)
*G06V 30/14* (2022.01)

(52) U.S. Cl.
CPC ......... *G06T 11/206* (2013.01); *G06T 11/60* (2013.01); *G06V 30/1444* (2022.01)

(58) Field of Classification Search
CPC ...... G06T 11/206; G06T 11/60; G06T 11/203; G06V 30/1444; G06V 30/1473; G06V 30/414; G06V 10/82; G06V 30/412
See application file for complete search history.

(56) References Cited

U.S. PATENT DOCUMENTS

| | | |
|---|---|---|
| 7,324,691 B2 | 1/2008 | Li et al. |
| 9,280,839 B2 | 3/2016 | Bowkett et al. |

(Continued)

FOREIGN PATENT DOCUMENTS

| | | |
|---|---|---|
| CN | 104778242 A | 7/2015 |
| CN | 111240670 A | 6/2020 |
| JP | 2020140450 A * | 9/2020 |

OTHER PUBLICATIONS

International Search Report and Written Opinion dated Oct. 12, 2021, directed to International Application No. PCT/CN2021/070926; 7 pages.

(Continued)

*Primary Examiner* — Jeffery A Brier
(74) *Attorney, Agent, or Firm* — Morrison & Foerster LLP

(57) ABSTRACT

A system for generating digital flowcharts is provided. The system receives sketch image data comprising a plurality of shapes and text, and processes the sketch image data to generate flowchart data by applying a first model configured to generate shape data, applying a second model configured to generate text data, and generating linking data that associates shape data and text data. The system may generate and display a visualization of the flowchart data. The system may map the flowchart data to a region of a presentation slide and display a visualization of the flowchart data on the presentation slide.

21 Claims, 7 Drawing Sheets

(56) References Cited

U.S. PATENT DOCUMENTS

| | | |
|---|---|---|
| 2003/0159128 A1 | 8/2003 | Kunzler |
| 2013/0278638 A1* | 10/2013 | Yoshikawa .......... G06Q 10/067 |
| | | 345/681 |
| 2017/0109578 A1* | 4/2017 | Bednarowicz ........ G06F 16/353 |
| 2017/0109579 A1* | 4/2017 | MéLinand ........... G06V 30/422 |
| 2017/0213112 A1 | 7/2017 | Sachs et al. |
| 2020/0151450 A1 | 5/2020 | Hishinuma et al. |
| 2021/0073530 A1* | 3/2021 | Schaefer .............. G06V 30/422 |
| 2022/0097228 A1* | 3/2022 | Schaefer .............. G06V 30/414 |

OTHER PUBLICATIONS

Matcha. "How to easily do Handwriting Recognition using Deep Learning," located at https://nanonets.com/blog/handwritten-character-recognition/, visited on Nov. 30, 2020. (30 pages).

Plimmer et al. (2007). "A Toolkit Approach to Sketched Diagram Recognition," People and Computers XXI-HCI . . . but not as we know it: Proceedings of HCI 2007: 1-9.

\* cited by examiner

AUTOMATED FLOW CHART GENERATION AND VISUALIZATION SYSTEM

REFERENCE TO RELATED APPLICATIONS

This application is a national phase application under 35 USC 371 of International Application No. PCT/CN2021/070926, filed Jan. 8, 2021, the entire contents of which is incorporated herein by reference.

FIELD OF THE DISCLOSURE

This relates to automated generation of virtual flowcharts, and, more particularly, to automatically creating flowcharts based on sketch image data and displaying the created flowcharts in presentation slides.

BACKGROUND OF THE DISCLOSURE

Organizing information into flowcharts enhances the visual clarity and coordination between different pieces of information. Flowcharts are used in a wide variety of industries, for example consulting, in which information is often shared through presentation files such as PowerPoint or Google Slides. Traditional methods of generating flowcharts to be included in presentation files involve a manual process, in which a user has to manually create a digital version of the flowcharts by executing manual inputs in a presentation application (e.g., using one or more of Microsoft PowerPoint, Adobe Photoshop, and Microsoft Visio).

SUMMARY OF THE DISCLOSURE

As described above, a user creating a presentation file including one or more flowcharts currently has to manually generate a digital version of the flowcharts in a presentation file using inputs executed via a program such as Microsoft PowerPoint, Adobe Photoshop, Microsoft Visio, or the like. The process of generating a digital flowchart can be cumbersome and time-consuming, and a user may prefer to create hand-drawn flowchart sketches because the process is simpler, faster, easier, and less distracting, particularly during collaborative brainstorming and white-boarding sessions. However, even when a user draws a hand-drawn flowchart sketch, the process of converting said hand-drawn sketch into a digital flowchart for inclusion in a presentation file is still cumbersome and time-consuming, requiring use of the same manual GUI inputs via a presentation creation program. Manually creating a digital version of flowcharts in this manner can be labor-intensive, imprecise, time consuming, and difficult to scale. Thus, there is a need for improved systems, methods, and techniques for quickly, accurately, and flexibly generating digital flowcharts based on hand-drawn sketches and displaying the generated digital flowcharts in presentation slides.

Accordingly, provided herein are automated systems, methods, and techniques for generating digital flowcharts based on hand-drawn sketches and displaying the generated digital flowcharts in presentation slides. The provided systems, methods, and techniques may address one or more of the needs explained above by efficiently, accurately, and flexibly generating digital flowcharts based on hand-drawn sketches and displaying the generated digital flowcharts in presentation slides.

In some embodiments, a system is provided for automatically converting hand-drawn flowchart sketches into digital flowcharts for display and/or editing in a presentation generation program. The system may include a sketch recognition module, a coordinate mapping module, and a presentation generation module.

In some embodiments, the sketch recognition module, coordinate mapping module, and presentation generation module (and/or any functionality provided thereby) can be provided in whole or in part as one or more separate systems, subsystems of a single system, a unified system, a network system, a server-hosted system, a distributed system, or a cloud system.

In some embodiments, the sketch recognition module may generate shape data and text data based on hand-drawn sketch image data received by the system. The sketch recognition system may detect objects present in a hand-drawn sketch, classify the one or more detected objects as being a type of shape or as being text, and generate location data for the shapes and text.

In some embodiments, the coordinate mapping module may generate flowchart data. In some embodiments, the generated flowchart data comprises data representing the location and class of (e.g., rectangle, arrow, ellipse, etc.) shape objects, the location and text contents of text objects, and linkings between shape and text objects. The coordinate mapping system may include optimization functions and algorithms which map the generated location data for a text object or shape object within the hand-drawn sketch to a region on a presentation slide. In some embodiments, the coordinate mapping system may include algorithms to link objects and keep the relative positions of different objects the same when generating the flowchart data based on the hand-drawn sketch.

In some embodiments, the presentation generation module may generate and display a visualization of the generated flowchart data. In some embodiments, the visualization of the generated flowchart data may be verified and/or updated in response to user input. In some embodiments, the generated digital flowchart may be visualized on presentation slides which can be stored, transmitted, and/or displayed.

As explained herein, the automated systems, methods, and techniques for generating flowchart data based on hand-drawn sketches and displaying the generated flowchart data in presentation slides may minimize the labor required by manual flowchart and slide generation processes. By automating the flowchart data generation process and by automatically generating presentation slides on which the generated flowchart data is displayed, the labor and time required to create presentations may be decreased. Furthermore, accuracy and comprehensiveness of presentation slides which contain flowchart data may be improved, as well as the ability to recreate and/or adapt generated flowchart data for future review and/or re-use.

In some embodiments, a system for generating digital flowcharts is provided, the system comprising a display and one or more processors configured to cause the system to: receive sketch image data comprising a plurality of shapes and text; process the sketch image data to generate flowchart data, wherein processing the sketch image data comprises: applying a first model configured to generate shape data based on the sketch image data, wherein applying the first model to generate the shape data comprises: detecting the presence of a shape in the sketch image data; generating classification data indicating a predicted class of the detected shape in the sketch image data; and generating first location data indicating a determined location of the shape; and processing the shape data to generate the flowchart data, wherein generating the flowchart data comprises generating linking data that associates the shape data with one or more other objects in the flowchart data; and generate and display, on the display, a visualization of the flowchart data.

In some embodiments of the system, receiving the sketch image data comprises receiving a user input indicating selection of the sketch image data from among a plurality of sketches uploaded to the system.

In some embodiments of the system, processing the sketch image data further comprises one or more of: cropping the sketch image data; rotating the sketch image data; and resizing the sketch image data.

In some embodiments of the system, the first model comprises one or more models selected from: a R-CNN model, a Faster-RCNN model, and a YOLO model.

In some embodiments of the system, predicting the class of the detected shape in the sketch image data comprises applying a classification algorithm to select the class from a predetermined set of classes.

In some embodiments of the system, the predetermined set of classes comprise two or more of arrow, line, rectangle, ellipse, diamond, and parallelogram.

In some embodiments of the system, the first location data comprises one or more of shape center coordinates, shape width, and shape height.

In some embodiments of the system, the first location data comprises a shape bounding box comprising four corner coordinates.

In some embodiments of the system, processing the shape data to generate the flowchart data further comprises: defining a plurality of regions for a presentation page; mapping the shape to one of the regions of the plurality of regions based on the center coordinates of the shape bounding box; and generating modified first location data based on region location data associated with the one of the regions.

In some embodiments of the system, the one or more other objects are associated with second location data.

In some embodiments of the system, generating the linking data comprises generating data that associates the shape with the one or more other objects based on the modified first location data and the second location data.

In some embodiments of the system, the one or more other objects comprises an arrow and the second location data indicates a location of one or more of an endpoint of the arrow and a header of the arrow.

In some embodiments of the system, the one or more other objects comprises a text object; processing the sketch image data further comprises: applying a second model configured to generate text data based on the sketch image data, wherein applying the second model to generate the text data comprises: detecting the presence of text in the sketch image data; and generating third location data indicating a determined location of the text; and generating the flowchart data is further based on processing the text data and generating the linking data such that the linking data associates the shape data with the text data.

In some embodiments of the system, the second model comprises one or more optical character recognition models selected from: a CNN model, a RNN model, and Attention Networks.

In some embodiments of the system, the third location data comprises a text bounding box comprising four corner coordinates.

In some embodiments of the system, the one or more processors are further configured to cause the system to generate and display, on the display: a visualization of the generated text data, and an editor interface configured to allow a user to modify the generated text.

In some embodiments of the system, displaying the visualization of the flowchart data comprises displaying the visualization of the flowchart data overlaid with the sketch image.

In some embodiments of the system, the one or more processors are further configured to: receive a first user input comprising an instruction to modify the flowchart data; in response to receiving the first user input, modify the flowchart data; and update display of the visualization of the flowchart based on the modified flowchart data.

In some embodiments of the system, the one or more processors are further configured to cause the system to interface with one or more APIs to generate one or more of PowerPoint slides, Google Slides, and Visio images based on the flowchart data.

In some embodiments, a method for generating digital flowcharts is provided, the method performed at a system comprising a display and one or more processors, the method comprising: receiving sketch image data comprising a plurality of shapes and text; processing the sketch image data to generate flowchart data, wherein processing the sketch image data comprises: applying a first model configured to generate shape data based on the sketch image data, wherein applying the first model to generate the shape data comprises: detecting the presence of a shape in the sketch image data; generating classification data indicating a predicted class of the detected shape in the sketch image data; and generating first location data indicating a determined location of the shape; and processing the shape data to generate the flowchart data, wherein generating the flowchart data comprises generating linking data that associates the shape data with one or more other objects in the flowchart data; and generating and displaying, on the display, a visualization of the flowchart data.

In some embodiments, a non-transitory computer-readable storage medium for generating digital flowcharts is provided, the non-transitory computer-readable storage medium storing instructions configured to be executed by a system comprising a display and one or more processors to cause the system to: receive sketch image data comprising a plurality of shapes and text; process the sketch image data to generate flowchart data, wherein processing the sketch image data comprises: applying a first model configured to generate shape data based on the sketch image data, wherein applying the first model to generate the shape data comprises: detecting the presence of a shape in the sketch image data; generating classification data indicating a predicted class of the detected shape in the sketch image data; and generating first location data indicating a determined location of the shape; and processing the shape data to generate the flowchart data, wherein generating the flowchart data comprises generating linking data that associates the shape data with one or more other objects in the flowchart data; and generate and display, on the display, a visualization of the flowchart data.

In some embodiments, any one or more of the features or aspects of any of the embodiments recited above may be combined in whole or in part with one another, and/or may be combined in whole or in part with any other feature or aspect disclosed herein.

BRIEF DESCRIPTION OF THE DRAWINGS

Various embodiments are described with reference to the accompanying figures, in which.

DETAILED DESCRIPTION OF THE DISCLOSURE

Described herein are automated flowchart generation and display systems and methods. In particular, provided are systems and methods for receiving a hand-drawn sketch image from a plurality of sketch images in a file storage unit, processing sketch image data to generate a plurality of shape data and text data, mapping the shape data and text data to a region of a presentation page, associating different elements of the shape data and the text data to generate flowchart data, and displaying a visualization of the flowchart data in a presentation file. Systems and methods provided may enable users to more efficiently and accurately generate flowchart data based on hand-drawn sketches and display the generated flowchart data in presentation slides. The techniques disclosed herein may provide a more comprehensive, accurate, and efficient presentation slide generation process by allowing users to revisit, modify, update, and re-apply steps taken to generate flowchart data based on hand-drawn sketch images.

Figure 1:
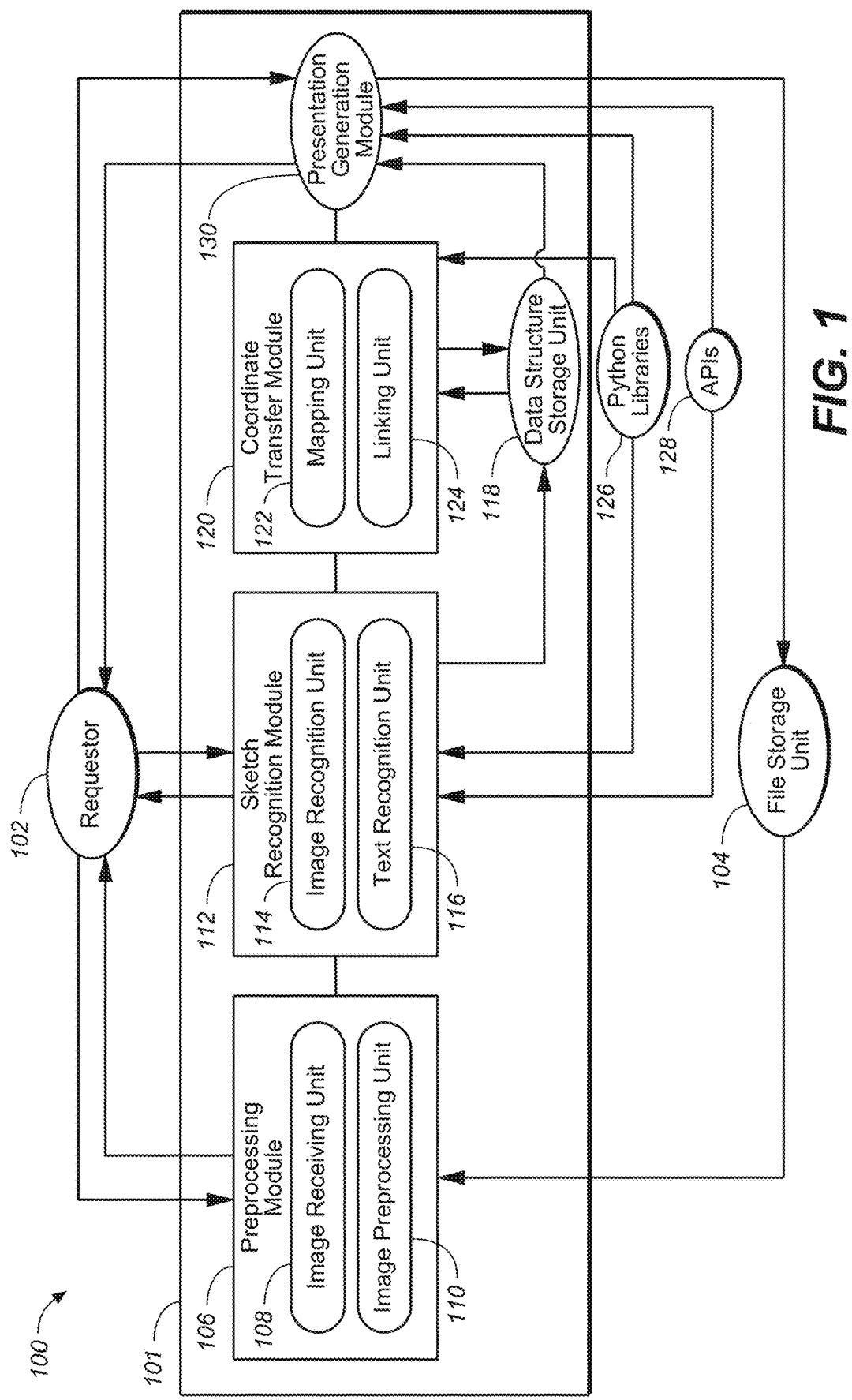
FIG. 1 depicts a system architecture of an automated flowchart generation and display system, according to some embodiments.

FIG. 1 depicts an automated flowchart generation and display system 100, according to some embodiments. Automated flowchart generation and display system 100 comprises flowchart generation and display tool 101 that can comprise any computer, processer, server, etc. that is configured to execute a method of flowchart data generation and display as described herein. Flowchart generation and display tool 101 may comprise preprocessing module 106, sketch recognition module 112, coordinate transfer module 120, presentation generation module 130, and data structure storage unit 118, as described further below. The preprocessing module 106, sketch recognition module 112, coordinate transfer module 120, presentation generation module 130, and data structure storage unit 118 may be provided by the same computer, processer, or server; additionally or alternatively, one or more of said modules may be provided by a different computer, processor, or server (e.g., tool 101 and/or system 100 may be provided in whole or in part as a server-hosted computing system, a distributed computing system, and/or a cloud-based computing system).

In some embodiments, automated flowchart generation and display system 100 can include requestor 102 (e.g., a user device and/or user system), which may be communicatively coupled (e.g., by wired or wireless network communication) with flowchart generation and display tool 101. In some embodiments, automated flowchart generation and display system 100 may further comprise one or more of: file storage unit 104, python libraries 126, and APIs 128, each of which may be communicatively coupled (e.g., by wired or wireless network communication) with flowchart generation and display tool 101. In some embodiments, the requestor 102, file storage unit 104, python libraries 126, and/or APIs 128 may be included within flowchart generation and display tool 101.

Requestor 102 may initiate flowchart generation and display using system 100 by transmitting one or more inputs to tool 101. In some embodiments, inputs received from requestor 102 may indicate instructions to upload sketch image data, indication of a selection of sketch image data, instructions to execute one or more preprocessing operations, and/or instructions to configure one or more preprocessing operations. For example, requestor 102 (which may be a user device and/or user system, such that a consultant can manually enter one or more inputs into an interface provided by flowchart generation and display investigation tool 101) may provide a selection of one or more hand-drawn sketches from file storage unit 104 as an input. In some embodiments, the hand-drawn sketch may be selected from a plurality of hand-drawn sketches stored in file storage unit 104. In some embodiments, the plurality of hand-drawn sketches may be presented in an image gallery which displays to a user one or more images at a time.

File storage unit 104 may include one or more suitable computer storage mediums. In some embodiments, file storage unit 104 comprises a database which organizes stored information. In some embodiments, file storage unit 104 comprises a database, such as a Redis database that supports data structures such as strings, hashes, lists, sets, bitmaps, hyperloglogs, geospatial indexes with radius queries, and streams.

Specifically, the request to input provided by requestor 102 may be received at preprocessing module 106 of tool 101. Preprocessing module 106 may be configured to receive sketch image data based on one or more selection inputs and generate, based on the sketch image data, preprocessed sketch image data. In some embodiments, preprocessing module 106 includes image receiving unit 108, which may be configured to electronically transmit sketch image data to the flowchart generation and display tool 101. (In some embodiments, image receiving unit 108 may be provided within flowchart generation and display tool 101 but not within preprocessing module 106.) In some embodiments, preprocessing module 106 comprises preprocessing unit 110, which may perform preprocessing operations including one or more of: cropping the sketch image data, rotating the sketch image data, and resizing the sketch image data. In some embodiments, preprocessing unit 110 may be configured to enable display of a graphical user interface via requestor 102 and/or enable receiving an input from requestor 102 via said GUI. In some embodiments, preprocessing module 108 may be configured to transmit the preprocessed sketch image data to the sketch recognition module 112.

Sketch recognition module 112 may be configured to receive the preprocessed sketch image data and generate, based on the preprocessed sketch image data, shape data and text data. In some embodiments, sketch recognition module 112 includes image recognition unit 114, which may be configured to process the sketch image data by applying an image recognition model to generate shape data. In some embodiments, shape data comprises data representing the location and class of (e.g., rectangle, arrow, ellipse, etc.) shape objects. In some embodiments, image recognition unit 114 may be configured to display an editor interface to requestor 102 and/or receive an input from requestor 102 to modify and/or verify the generated shape data. In some embodiments, sketch recognition module 112 may comprise text recognition unit 116, which may be configured to process the sketch image data by applying a text recognition model to generate text data. In some embodiments, text data comprises data representing the location and text content of text objects. In some embodiments, text recognition unit 116 may be configured to display an editor interface to requestor 102 and/or receive an input from requestor 102 to modify and/or verify the generated text data. In some embodiments, sketch recognition module 112 may be configured to store the shape data and the text data on a data storage medium of the automated flowchart generation and display tool 101, such as data structure storage unit 118. In some embodiments, sketch recognition module 112 may be configured to transmit the shape data and the text data to the coordinate transfer module 120.

Coordinate transfer module 120 may be configured to receive the shape data and the text data and generate, based on the shape data and the text data, flowchart data. In some embodiments, flowchart data comprises data representing the location and class (e.g., rectangle, arrow, ellipse, etc.) of shape objects, the location and text contents of text objects, and linkings between shape and text objects. In some embodiments, coordinate transfer module 120 includes mapping unit 122, which may be configured to generate modified shape data and modified text data, wherein the modified shape data and modified text data are mapped to a region of a presentation page. In some embodiments, coordinate transfer module 120 includes linking unit 124, which may be configured to associate different elements of the shape data and the text data to generate flowchart data. In some embodiments, coordinate transfer module 120 may be configured to store one or more of: the modified shape data, the modified text data, and the flowchart data on a data storage medium of the automated flowchart generation and display tool 101, such as data structure storage unit 118. In some embodiments, coordinate transfer module 120 may be configured to transmit the flowchart data to the presentation generation module 130.

Presentation generation module 130 may be configured to receive the flowchart data and generate and display a visualization of the flowchart data. In some embodiments, presentation generation module 130 may interface with one or more APIs 128 to display a visualization of the flowchart data on presentation slides. In some embodiments, a Google Slides API may be used to create and update Google slides. In some embodiments, presentation generation module 130 may use one or more python libraries 126 to display a visualization of the flowchart data on presentation slides. In some embodiments, the python-pptx python library may be used to create and update local PowerPoint slides. In some embodiments, the presentation slides may be downloaded and stored in file storage unit 104.

Figure 2:
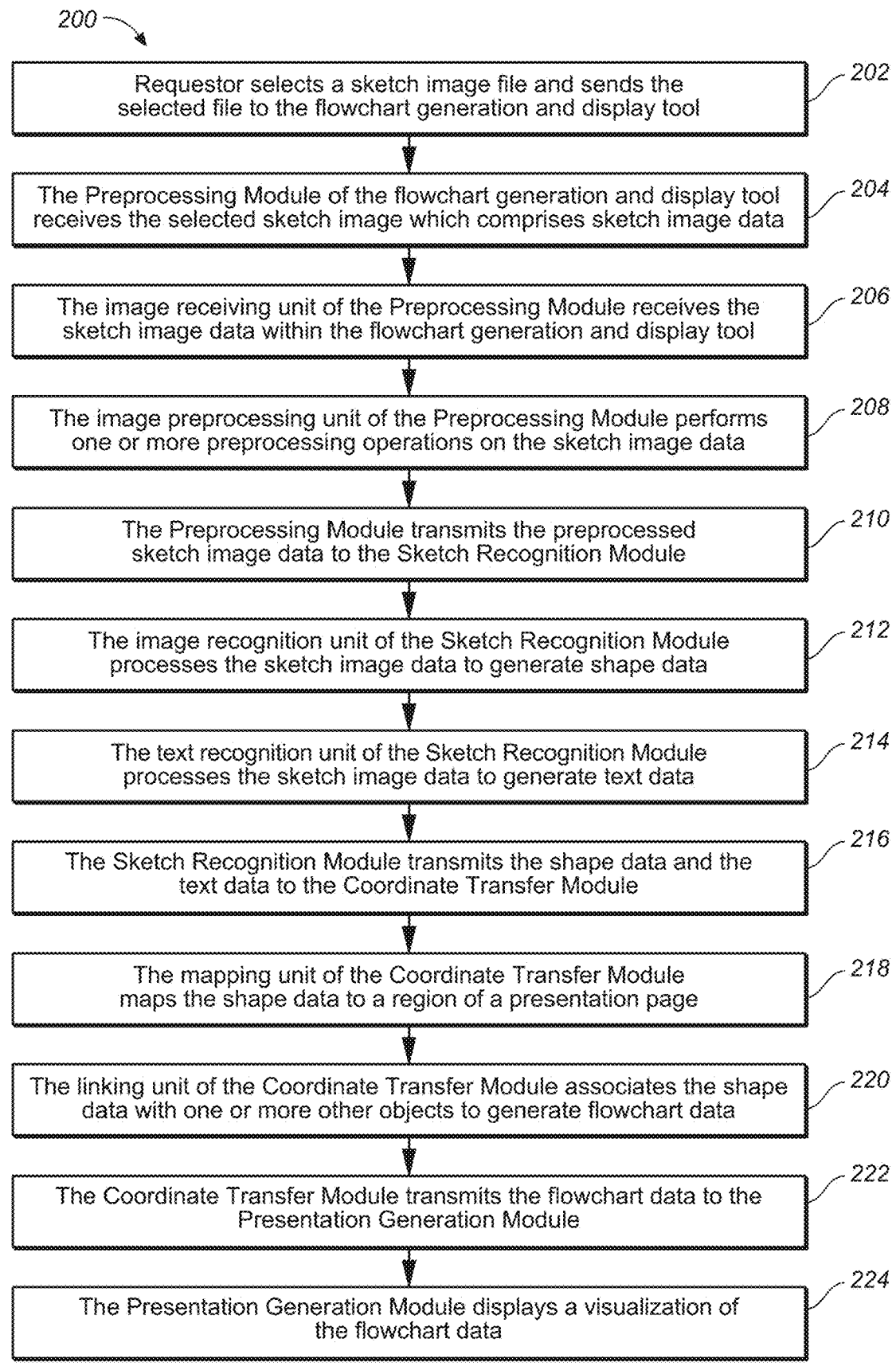
FIG. 2 depicts a flowchart of a method for using an automated flowchart generation and display system, according to some embodiments.

FIG. 2 depicts a flowchart of a method for using an automated flowchart generation and display system, according to some embodiments. As shown, FIG. 2 depicts a method by which an automated flowchart generation and display system (e.g., automated flowchart generation and display system 100 of FIG. 1) generates presentation slides by generating and visualizing a data structure (e.g., flowchart) based on a hand-drawn sketch image.

At block 202, in some embodiments, a requestor 102 may send an input to a flowchart generation and display tool. In some embodiments, this step may include initiating flowchart generation by providing an input to an automated flowchart generation and display system (e.g., automated flowchart generation and display system 100 of FIG. 1). In some embodiments, as discussed above, the input may comprise a selection of one or more hand-drawn sketches (e.g., stored in file storage unit 104) that may be a subject of the flowchart generation and display.

At block 204, in some embodiments, a preprocessing module (e.g., preprocessing module 106 described with respect to FIG. 1) of the flowchart generation and display tool 101 may receive the input (e.g. the selected and/or uploaded hand-drawn sketch image which comprises sketch image data). In some embodiments, the sketch image data comprises a plurality of shapes and text.

At block 206, in some embodiments, an image receiving unit (e.g., image receiving unit 108 described with respect to FIG. 1) of the preprocessing module may receive the sketch image data within the flowchart generation and display tool 101.

At block 208, in some embodiments, an image preprocessing unit (e.g., image preprocessing unit 110 described with respect to FIG. 1) of the preprocessing module may preprocess the sketch image data. In some embodiments, preprocessing unit 110 may be configured to display an editor interface to requestor 102 and/or receive an input from requestor 102 to preprocess the image. In some embodiments, preprocessing the sketch image data comprises one or more of cropping the sketch image data, rotating the sketch image data, and resizing the sketch image data. In some embodiments, preprocessing the sketch image data comprises establishing a base size for the sketch image. In some embodiments, the base size for the sketch image is 416*416 pixels. In some embodiments, preprocessing the sketch image data comprises image denoising. In some embodiments, image denoising is achieved by a Gaussian smoothing function.

At block 210, in some embodiments, the preprocessing module may transmit the preprocessed sketch image data to a sketch recognition module (e.g., sketch recognition module 112 described with respect to FIG. 1).

At block 212, in some embodiments, an image recognition unit (e.g., image recognition unit 114 described with respect to FIG. 1) of the sketch recognition module may generate shape data. In some embodiments, the image recognition unit generates shape data by applying an image recognition model. In some embodiments, the image recognition model may be (or may include) a Region-Convolutional Neural Network (R-CNN) model, a Faster-RCNN model, and/or a YOLO model.

In some embodiments, the image recognition model may be trained using sketch images. In some embodiments, the image recognition model may be trained using at least 100 or more, 1,000 or more, 10,000 or more, or 100,000 or more sketch images. In some embodiments, the sketch images used to train the image recognition model may be hand-drawn. In some embodiments, the sketch images used to train the image recognition model may be drawn on a whiteboard and/or on paper. In some embodiments, the sketch images used to train the image recognition model contain one or more classes of shapes, the one or more classes of shapes including: arrow, line, rectangle, ellipse, diamond, and parallelogram. In some embodiments, the sketch images used to train the image recognition model may contain arrangements of the one or more classes of shapes. In some embodiments, the arrangements of the one or more classes of shapes may include a flowchart, a network diagram, and/or a tree structure. In some embodiments, label tools including LabelMe and/or LabelImg may be used to label the sketch images. In some embodiments, the label includes information about shape class and shape size. In some embodiments, the label information is stored in an output file. In some embodiments, the output file is a JSON file stored on any computer readable storage medium. The labeled output file may contain data indicating a shape type and data indicating location data (e.g., four corner coordinates for bounding box) for each shape indicated.

In some embodiments, applying the image recognition model may comprise determining whether the sketch image comprises one or more flowcharts, detecting the presence of a shape in the sketch image data, generating classification data indicating a predicted class of the shape in the sketch image data, and/or generating location data indicating a determined location of the shape in the sketch image data.

In some embodiments, determining whether the sketch image comprises one or more flowcharts comprises detecting the arrangement of one or more shapes relative to each other and applying one or more algorithms to determine whether the input image data meets criteria to be classified as a flowchart (or alternately whether it meets criteria to be classified as a network diagram, a tree structure, and/or any another kind of image that is not a flowchart). In some embodiments, determining whether sketch image data includes one or more flowcharts may be performed as an initial determination upon which subsequent processing steps are conditioned; for example, if the system determines that input data does not include a flowchart, then processing may cease. In some embodiments, determination of whether input image data includes a flowchart may be made by the image recognition model or may be made by a separate algorithm/model.

In some embodiments, detecting the presence of a shape in the sketch image data comprises determining whether one or more shape objects are contained within the sketch image. In some embodiments, determining whether one or more shape objects are contained within the sketch image comprises performing contour detection. In some embodiments, one or more python libraries (e.g., the OpenCV python library) are used to perform contour detection.

In some embodiments, generating classification data indicating a predicted class of a shape in the sketch image data comprises applying a classification algorithm to select the class from a predetermined set of classes. In some embodiments, the predetermined set of classes may comprise two or more of: arrow, line, rectangle, ellipse, diamond, and parallelogram. In some embodiments, the classification algorithm assigns a class label (e.g. rectangle) to the shape. In some embodiments, the classification algorithm may assign one or more confidence scores quantifying one or more respective confidence levels with which a shape is labeled as falling into one or more particular classes.

In some embodiments, generating location data indicating a determined location of a shape in the sketch image data comprises locating the presence of the shape in the sketch image data and indicating the location of the shape (in some embodiments via a bounding box assigned to the shape). In some embodiments, location data of the shape comprises one or more of: shape center coordinates, shape width, shape height, and shape corner coordinates (e.g. four pairs of (x,y) corner coordinates). In some embodiments, a bounding box surrounds the detected shape and location data of the bounding box comprises one or more of: bounding box center coordinates, bounding box width, bounding box height, and bounding box corner coordinates (e.g., four pairs of (x,y) corner coordinates). In some embodiments, the location of the bounding box is determined by dividing the sketch image into a grid of cells, such that each cell is responsible for predicting a bounding box if the center of the bounding box falls within it. In some embodiments, each grid cell predicts the presence and size of the bounding box, and predicts the confidence.

In some embodiments, the output of the image recognition unit comprises generated shape data which comprises location data and a class label for each shape. In some embodiments, the generated shape data is stored in an output file. In some embodiments, the output file is a JSON file stored on any computer readable storage medium, such as data structure storage unit 118. In some embodiments, the image recognition unit may be configured to enable display of an editor interface via a requestor (e.g., requestor 102) and/or to receive an instruction (based on an input executed via said interface) to modify and/or verify the generated location data and/or classification (e.g., class label) data. In some embodiments, the editor interface may display rendered shapes and/or bounding boxes based on the shape and location data overlaid on the original sketch image, such that a user may easily compare the generated shape data to the original sketch in a visually intuitive manner.

At block 214, in some embodiments, a text recognition unit (e.g., text recognition unit 116 described with respect to FIG. 1) of the sketch recognition module may generate text data. In some embodiments, the text recognition unit generates text data by applying a text recognition model. In some embodiments, the text recognition model may comprise an optical character recognition (OCR) model used to recognize and identify characters, including handwritten text and numbers. In some embodiments, the OCR model may be include (and/or be trained using and/or be modified by) one or more deep learning models (e.g., a Convolutional Neural Network (CNN) model, a Recurrent Neural Network (RNN) model, and/or Attention Networks) to better interpret the handwritten text. For example, the OCR model may be trained using sketch images stored on a data storage medium (e.g., file storage unit 104) to overcome known challenges (e.g., large variability and ambiguity of handwriting style of an individual user over time and between different users, text which is not in a straight line, cursive handwriting in which there is minimal separation between characters, or handwriting which is slanted either to the right or to the left relative to upright printed text) associated with handwriting recognition. In some embodiments, the OCR model trained by one or more deep learning models overcomes known challenges associated with handwriting recognition by using transform architectures to perform Intelligent Character Recognition (ICR) on handwritten text. In some embodiments, the OCR model may interface with one or more APIs (e.g., Azure's computer vision API and/or Google Cloud's vision API) to interpret the handwritten text. In some embodiments, the system may be configured to conditionally interface with one or more API's to perform interpretation of handwritten text. For example, if the output of the OCR model modified with one or more deep learning models is worse (e.g., has more errors and/or errors of a greater magnitude) than the output of the OCR model without any modifications, or if the OCR model modified with one or more deep learning models cannot provide an acceptable level of accuracy, then the system may be configured to leverage handwritten text interpretation techniques provided via the one or more APIs. In some embodiments, the text recognition unit may provide different options from which a requestor (e.g., requestor 102 described with respect to FIG. 1) can select one or more OCR models to use.

In some embodiments, applying the text recognition model may comprise detecting the presence of text in the sketch image data and/or generating location data indicating a determined location of the text in the sketch image data. In some embodiments, detecting the presence of text in the sketch image data comprises applying one or more OCR models to the sketch image data to determine whether one or more text objects are contained within the sketch image. In some embodiments, determining whether one or more text objects are contained within the sketch image by applying one or more OCR models comprises identifying key information such as the loop, the inflection point, and/or the aspect ratio of an individual character, and/or identifying language-related dependencies of character sequences. Embedding language knowledge into the model itself is advantageous at least to reduce the need for additional post-processing using a language model.

In some embodiments, generating location data indicating a determined location of text in the sketch image data comprises locating the presence of the text in the sketch image data and indicating the location of the text (in some embodiments via a bounding box assigned to the text). In some embodiments, a bounding box surrounds the text and location data of the bounding box comprises one or more of: bounding box center coordinates, bounding box width, bounding box height, and bounding box corner coordinates. In some embodiments, the location of the bounding box is determined by dividing the sketch image into a grid of cells, such that each cell is responsible for predicting a bounding box if the center of the bounding box falls within it. In some embodiments, each grid cell predicts the presence and size of the bounding box, and predicts the confidence.

In some embodiments, the output of the text recognition unit comprises generated text data which comprises location data and text content associated with each text object. In some embodiments, the generated text data is stored in an output file. In some embodiments, the output file is a JSON file stored on any computer readable storage medium, such as data structure storage unit 118. In some embodiments, the text recognition unit may be configured to enable display of an editor interface via a requestor (e.g., requestor 102) and/or to receive an instruction (based on an input executed via said interface) to modify and/or verify the generated text data. In some embodiments, the editor interface may display the rendered text and/or bounding boxes based on the location data in a separate window. In some embodiments, the separate window is displayed as a side window adjacent to a display of the sketch image, such that a user may easily compare the generated location and text content data to the original sketch in a visually intuitive manner.

At block 216, in some embodiments, the sketch recognition module may transmit the shape data and the text data to a coordinate transfer module (e.g., coordinate transfer module 120 described with respect to FIG. 1).

At block 218, in some embodiments, a mapping unit (e.g., mapping unit 122 described with respect to FIG. 1) of the coordinate transfer module may define a plurality of regions for a presentation page, map the shape data and/or the text data to one or more respective regions of the plurality of regions of the presentation page, and/or generate modified location data based on region location data (e.g., location data representing a location of a region of the presentation page) associated with one of the regions of the presentation page. In some embodiments, defining a plurality of regions for a presentation page comprises determining the presentation page width (e.g., $9.15*10^6$ pixels for a 16:9 presentation page) and the presentation page height (e.g., $5.15*10^6$ pixels for a 16:9 presentation page); receiving an input from a requestor (e.g., requestor 102 described with respect to FIG. 1) comprising an instruction to select a resolution factor (e.g., 5, 10, or 100); and in response to receiving the input, dividing the presentation page into a grid comprising a plurality of regions (e.g., rectangles or squares), wherein the number of rows of the grid is determined by dividing the presentation page height by the resolution factor and the number of columns of the grid is determined by dividing the presentation page width by the resolution factor. In some embodiments, the presentation page width and height may be defined for a 4:3 presentation page or a 16:10 presentation page.

In some embodiments, mapping shape data to one of the regions of the plurality of regions of the presentation page comprises mapping the shape bounding box to a region (e.g., to a rectangle or to a square) associated with the presentation page. In some embodiments, mapping the shape bounding box to a rectangle associated with the presentation page comprises: first, determining the center coordinates (e.g., a pair of (x,y) corner coordinates) of the rectangle; second, determining the center coordinates (e.g., a pair of (x,y) corner coordinates) of the shape bounding box; third, calculating the distance between the rectangle and the shape bounding box, according to the equation $d=|C_b-C_s|$, where $C_b$ represents the center coordinates of the shape bounding box and $C_s$ represents the center coordinates of the rectangle; and fourth, determining which rectangle is closest to the shape bounding box by repeating the third step for all rectangles in the grid of rectangles and selecting the minimum distance between the shape bounding box and the rectangle.

In some embodiments, generating modified location data based on region location data associated with one of the regions of the presentation page comprises modifying the center coordinates of the shape bounding box to match those of the rectangle determined to be closest to the shape bounding box.

In some embodiments, the output of the mapping unit is modified shape data that comprises shape data mapped to a region on a presentation page. In some embodiments, the modified shape data is stored in an output file. In some embodiments, the output file is a JSON file stored on any computer readable storage medium, such as data structure storage unit 118.

At block 220, in some embodiments, a linking unit (e.g., linking unit 124 described with respect to FIG. 1) of the coordinate transfer module may generate flowchart data. In some embodiments, the generated flowchart data comprises data representing the location and class of (e.g., rectangle, arrow, ellipse, etc.) shape objects, the location and text contents of text objects, and linkings between shape and text objects. In some embodiments, the linking unit generates flowchart data by generating linking data that associates shape data with one or more other objects. In some embodiments, the one or more other objects comprise arrow data and text data which may also have been derived from processing the hand-drawn sketch image data. In some embodiments, the arrow data is generated according to the shape data generation method described with respect to block 212 (e.g., detecting the presence of a shape in the sketch image data, generating classification data indicating a predicted class of the shape in the sketch image data, and/or generating location data indicating a determined location of the shape in the sketch image data), with an additional step wherein if the predicted class of a shape is determined to be an arrow, further location data pertaining to the arrow header and the arrow endpoint is generated. In some embodiments, the location of each the tip of the arrow header and the arrow endpoint is determined using contour detection (e.g., using python library OpenCV) and assigned a pair of coordinates (e.g., a pair of (x,y) coordinates in the Cartesian Coordinate System). Thus, the arrow data may comprise one or more of: arrow header coordinates, arrow endpoint coordinates, arrow center coordinates, arrow width, and arrow height. In some embodiments, the text data is generated according to the text data generation method described with respect to block 214.

In some embodiments, generating linking data that associates shape data with arrow data comprises determining if an arrow header intersects a shape. In some embodiments, determining if the arrow header intersects the shape comprises: first, calculating the distance between the arrow header and one side of the bounding box surrounding the shape, for example according to the equation $$d=|(y_2-y_1)x_h-(x_2-x_1)y_h+x_2y_1-x_1y_2|/\text{norm}((x_1,y_1),(x_2,y_2)), \quad (1)$$

where $(x_h,y_h)$ represents the coordinates of the arrow header, $(x_1,y_1)$ represents the coordinates of the start of the side of the bounding box, $(x_2,y_2)$ represents the coordinates of the end of the side of the bounding box, and norm is the root mean square of $(x_1,y_1)$ and $(x_2,y_2)$; second, calculating the distance between the arrow header and the remaining three sides of the bounding box surrounding the shape by applying the distance equation above; third, determining which side of the bounding box the header is closest to by selecting the minimum distance value calculated in the first and second steps; fourth, determining if the selected minimum distance value is smaller than a predetermined threshold distance (e.g., $1*10^{-6}$); and fifth, if the selected minimum distance value is smaller than the predetermined threshold distance, determining that the arrow header intersects the shape and modifying the arrow header location data such that the arrow header coordinates are $x_h=|x_1-x_2|/2$ and $y_h=|y_1-y_2|/2$.

In some embodiments, generating linking data that associates shape data with arrow data comprises determining if an arrow endpoint intersects a shape. In some embodiments, determining if the arrow endpoint intersects the shape comprises: first, calculating the distance between the arrow header and one side of the bounding box surrounding the shape, for example according to the equation $$d=|(y_2-y_1)x_e-(x_2-x_1)y_e+x_2y_1-x_1y_2|/\text{norm}((x_1,y_1),(x_2,y_2)), \quad (2)$$

where $(x_e,y_e)$ represents the coordinates of the arrow endpoint, $(x_1,y_1)$ represents the coordinates of the start of the side of the bounding box, $(x_2,y_2)$ represents the coordinates of the end of the side of the bounding box, and norm is the root mean square of $(x_1,y_1)$ and $(x_2,y_2)$; second, calculating the distance between the arrow endpoint and the remaining three sides of the bounding box surrounding the shape by applying the distance equation above; third, determining which side of the bounding box the header is closest to by selecting the minimum distance value calculated in the first and second steps; fourth, determining if the selected minimum distance value is smaller than a predetermined threshold distance (e.g., $1*10^{-6}$); and fifth, if the selected minimum distance value is smaller than the predetermined threshold distance, determining that the arrow endpoint intersects the shape and modifying the arrow endpoint location data such that the arrow endpoint coordinates are $x_e=|x_1-x_2|/2$ and $y_e=|y_1-y_2|/2$.

In some embodiments, generating linking data that associates shape data with text data comprises determining if the text bounding box overlaps the shape bounding box. In some embodiments, determining if the text bounding box overlaps the shape bounding box comprises checking a set of cases in which the text bounding box and the shape bounding box do not overlap: first, assigning $t_1$, with coordinates $(t_1x_1,t_1y_1)$, to be the top-left coordinate of the first bounding box (e.g., the text bounding box), assigning $t_2$, with coordinates $(t_2x_2,t_2y_2)$, to be the bottom-right coordinate of the first bounding box, assigning $s_1$, with coordinates $(s_1x_1,s_1y_1)$, to be the top-left coordinate of the second bounding box (e.g., the shape bounding box), and assigning $s_2$, with coordinates $(s_2x_2,s_2y_2)$, to be the bottom-right coordinate of the second bounding box; second, determining if the first bounding box is on the right side of the right edge of the second bounding box by checking if $t_1x_1$ is greater than or equal to $s_2x_2$; third, determining if the first bounding box is on the left side of the left edge of the second bounding box by checking if $t_2x_2$ is less than or equal to $s_1x_1$; fourth, determining if the first bounding box is below the bottom edge of the second bounding box by checking if $t_1y_1$ is less than or equal to $s_2y_2$; and fifth, determining if the first bounding box is above the top edge of the second bounding box by checking if $t_2y_2$ is greater than or equal to $s_1y_1$.

If none of the second through fifth steps results in a determination that the text bounding box and the shape bounding box do not overlap (i.e., the second through fifth steps result in a determination that the text bounding box and the shape bounding box overlap), then the shape data is linked with the text data by modifying the center coordinates of the text bounding box to match the center coordinates of the shape bounding box.

If one or more of the second through fifth steps results in a determination that the text bounding box and the shape bounding box do not overlap, then the shape data is not linked with the text data. Instead, the location data of the text data is modified according to the mapping method described above with respect to block 218, such that the text data is mapped to a region of a presentation page.

In some embodiments, the output of the linking unit is generated flowchart data that comprises shape data linked to arrow data and/or text data. In some embodiments, the generated flowchart data is stored in an output file. In some embodiments, the output file is a JSON file stored on any computer readable storage medium, such as data structure storage unit 118.

At block 222, in some embodiments, the coordinate transfer module may transmit the flowchart data to a presentation generation module (e.g., presentation generation module 130 described with respect to FIG. 1).

At block 224, in some embodiments, the presentation generation module causes the system to generate and display a visualization of the flowchart data. In some embodiments, the visualization of the flowchart data may be an interactive visualization. For example, a user of system 100 to whom the visual representation is displayed may be able to select, highlight, hide, and/or drill-down on one or more portions of the visual representation. In some embodiments, a user may be able to modify and/or verify the shape data as described with respect to block 212. In some embodiments, a user may be able to modify and/or verify the text data as described with respect to block 214.

In some embodiments, displaying a visualization of the flowchart data comprises interfacing with one or more APIs 128 to display a visualization of the flowchart data on presentation slides. In some embodiments, a Google Slides API may be used to create and update presentation data including a visualization of the flowchart data in Google slides. In some embodiments, displaying a visualization of the flowchart data comprises using one or more python libraries 126 to display a visualization of the flowchart data on presentation slides. In some embodiments, the python-pptx python library may be used to create and update PowerPoint slides. In some embodiments, the presentation slides may be stored in file storage unit 104.

Figure 3A:
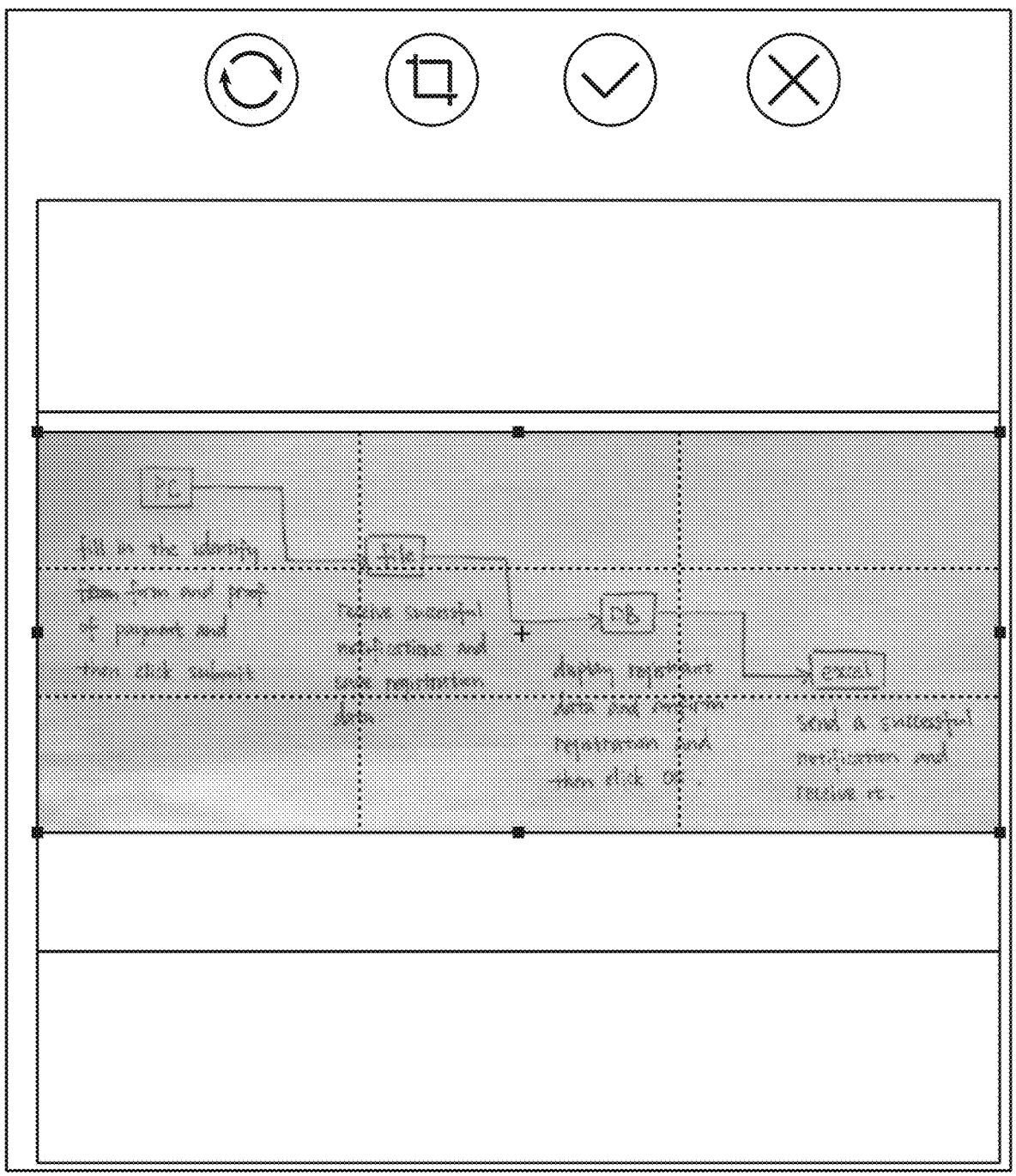
FIG. 3A shows a graphic user interface of an automated flowchart generation and display system, according to some embodiments.

FIG. 3A shows a graphic user interface of an automated flowchart generation and display system, and more particularly, an editor interface for preprocessing sketch image data, according to some embodiments. In particular, FIG. 3A depicts a screen of a graphical user interface comprising a visualization of a selected sketch image. As shown in FIG. 3A, a user of the graphical user interface may be able to interact with the visual representation of the sketch image by making one or more edits comprising: rotating the image (e.g., by clicking on the button shown in the left-most position), and cropping the image (e.g., by clicking on the button shown in the second-from-the-left position); verifying the edits made (e.g., by clicking on the button shown in the second-from-the-right position); and rejecting the edits made (e.g., by clicking on the button shown in the right-most position).

Figure 3B:
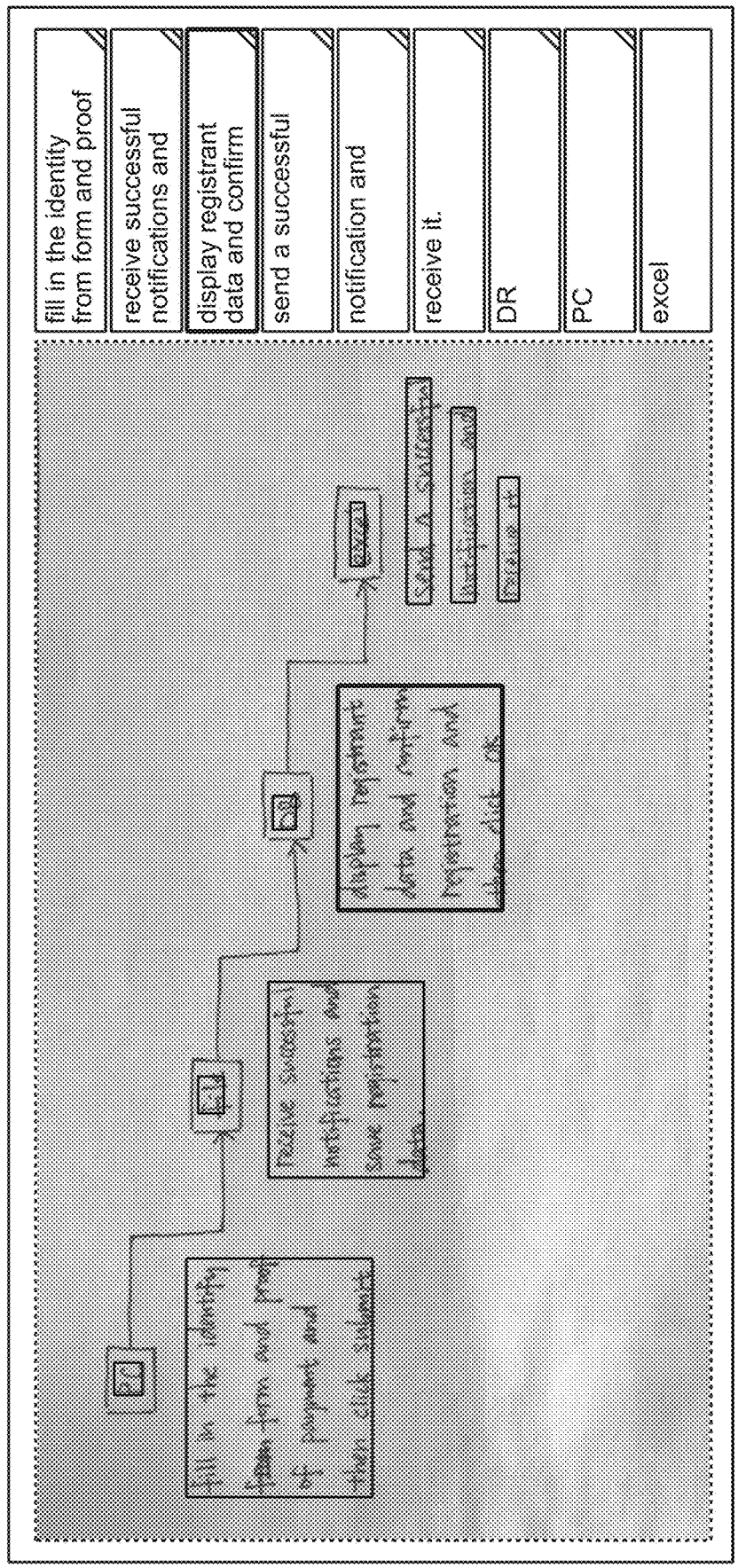
FIG. 3B shows a graphic user interface of an automated flowchart generation and display system, according to some embodiments.

FIG. 3B shows a graphic user interface of an automated flowchart generation and display system, and more particularly, an editor interface for modifying and/or verifying text data, according to some embodiments. In particular, FIG. 3B depicts a screen of a graphical user interface comprising a visualization of text data in a sketch image window. As shown in FIG. 3B, the graphical user interface may highlight (e.g., in beige) a text bounding box associated with each text object contained within a sketch image. In some embodiments, each bounding box may be overlaid with and/or displayed alongside (a) the original text content of the image and/or (b) a digital rendering of the recognized text. Side-by-side or overlaid display may allow the user to compare the original image to the text bounding boxes detected and to the characters detected. In the example of FIG. 3B, the original image is shown with bounding box visualizations overlaid with the image to show where text objects were recognized in the image, and a digital rendering of the characters recognized in each text object are shown beside the original image in the panel along the right side of the screen.

In some embodiments, visualizing the bounding boxes and/or characters recognized by the system may provide the user with an opportunity to execute inputs to modify the text objects and characters recognized by the system. For example, a user may be able to modify the bounding boxes detected for the text objects by interacting with the displayed visualizations of the bounding boxes to modify the shape, size, and/or number of text objects. A user may be able to resize or move text objects. A user may be able to delete or add new text objects. A user may be able to split a single text object into multiple text objects. A user may be able to combine multiple text objects into a single text object. For example, as shown in the right-most series of bounding boxes overlaid on the sketch image portion of FIG. 3B, the system may erroneously classify what should be a single text object as instead being three separate text objects, each of which comprises its own associated bounding box. The system may then receive an input from a user to combine the three separate text objects into a single text object with one associated bounding box.

The graphical user interface may show a visual representation of the interpreted handwritten text associated with each text object in a separate window (e.g., a text editing window on the right side of the sketch image, as shown in FIG. 3B). A user of the graphical user interface may be able to interact with the visual representation of the interpreted handwritten text by selecting a highlighted text bounding box. The graphical user interface may highlight the selected text bounding box in a different color (e.g., in orange) in one or both the sketch image window and the text editing window. A user may interact with the text editing window by modifying and/or verifying the interpreted handwritten text.

Figure 3C:
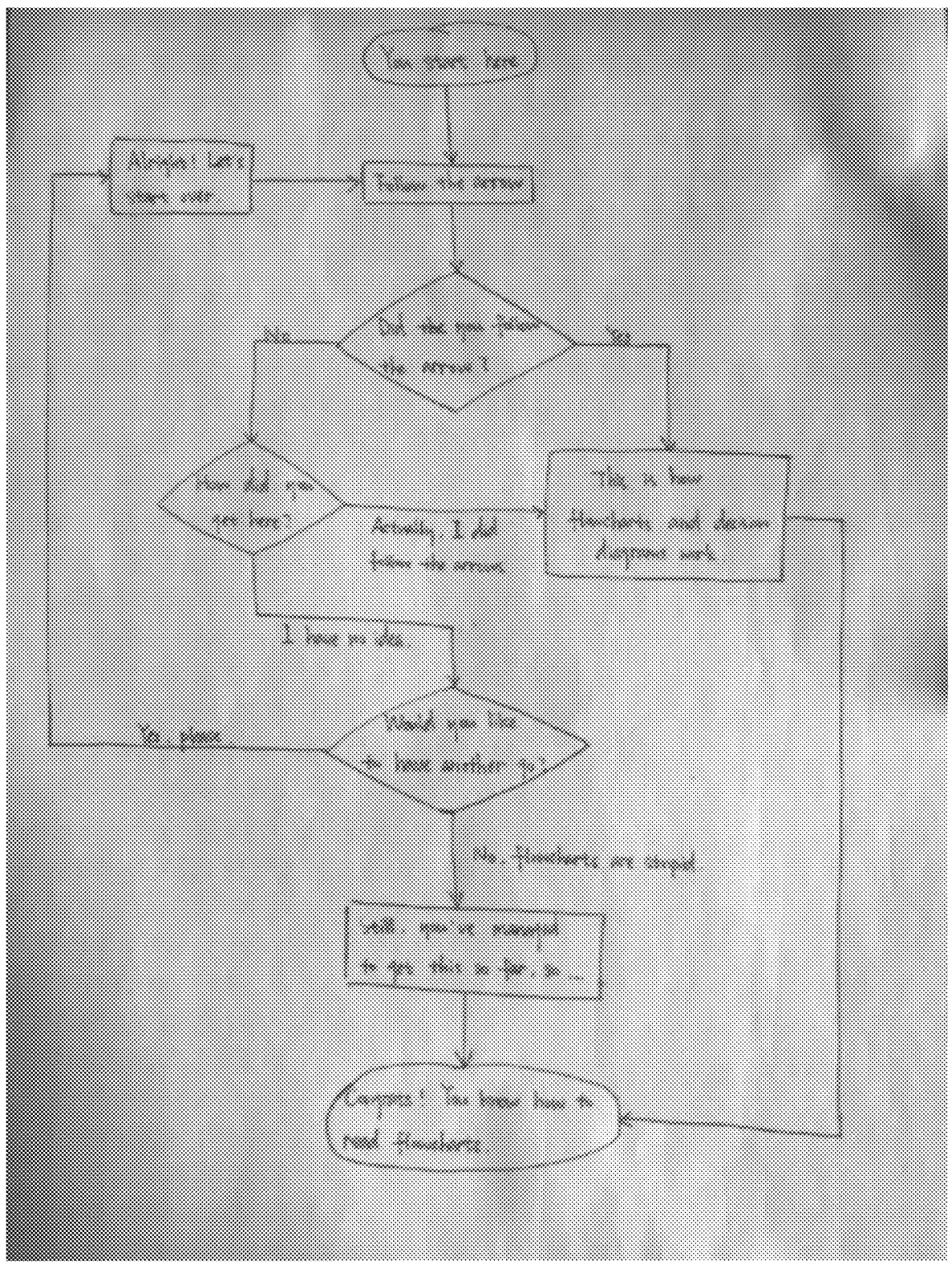
FIG. 3C shows a sketch image, according to some embodiments.

FIG. 3C shows a visualization of a selected sketch image received by an automated flowchart generation and display system, for example received by an image receiving unit 108 of flowchart generation and display tool 101. In some embodiments, the sketch image may be used as an input to generate the flowchart data displayed in FIG. 3D.

Figure 3D:
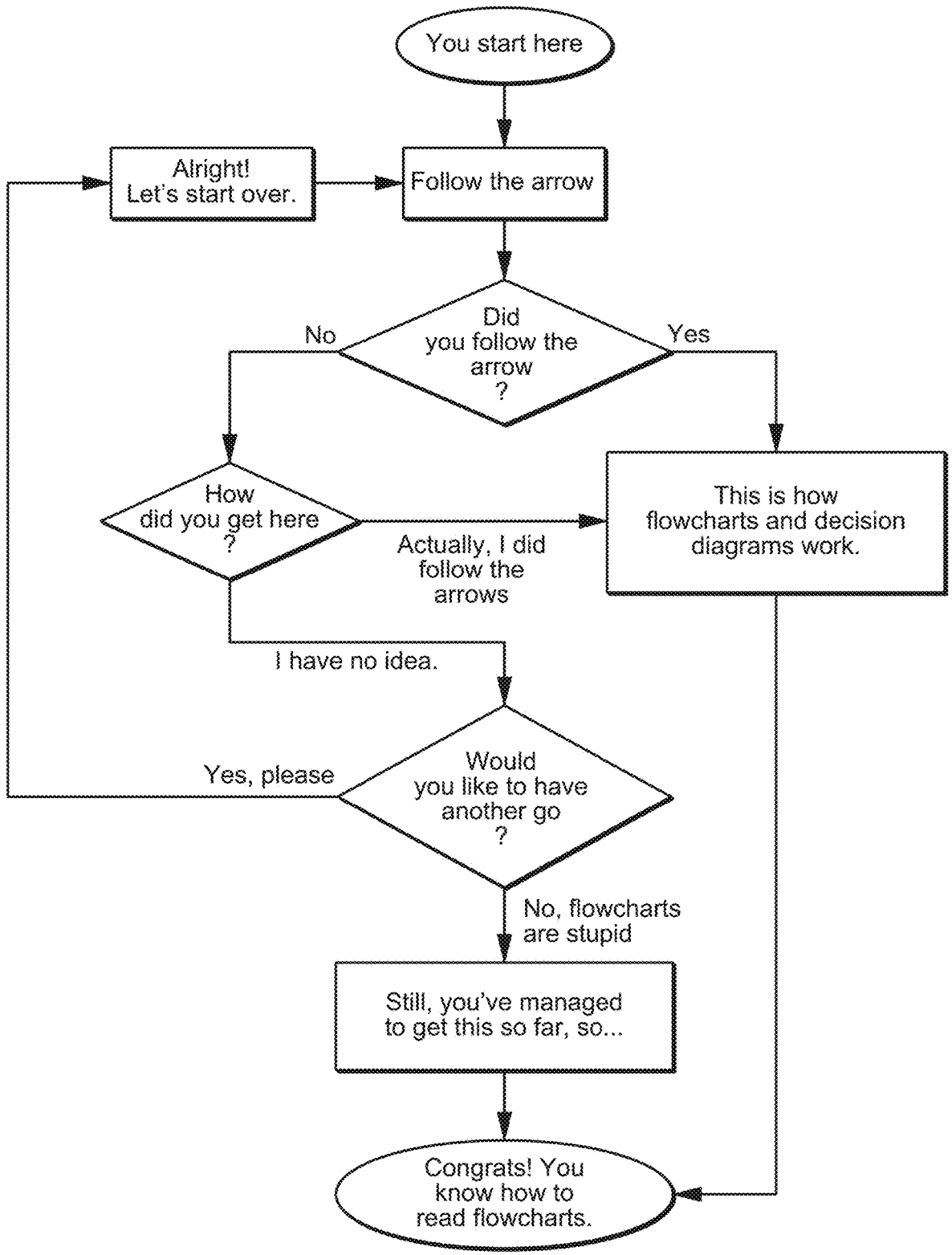
FIG. 3D shows a graphic user interface of an automated flowchart generation and display system, according to some embodiments.

FIG. 3D shows a graphic user interface of an automated flowchart generation and display system, and more particularly, an editor interface for modifying and/or verifying shape data, according to some embodiments. In particular, FIG. 3D depicts a screen of a graphical user interface comprising a visualization of rendered shapes generated based on the received sketch image shown in FIG. 3C. The graphical user interface may show a visual representation of the generated shape data associated with each shape object in a separate window (e.g., a shape editing window shown in a side-by-side display with the sketch image). Alternatively, the generated shape data may be shown overlaid (e.g., as an outline overlay or partially-transparent overlay) on the sketch image. A user of the graphical user interface may be able to interact with the visual representation of the shape data by modifying and/or verifying the location data and/or shape classification data associated with the shape data (and/or by adding new shapes and/or arrows or deleting shapes and/or arrows). The system may not always generate a shape properly. For example, an arrow may not be linear when it should be based on the sketch image. The system may then receive an input from a user to correct the display of the arrow.

Figure 4:
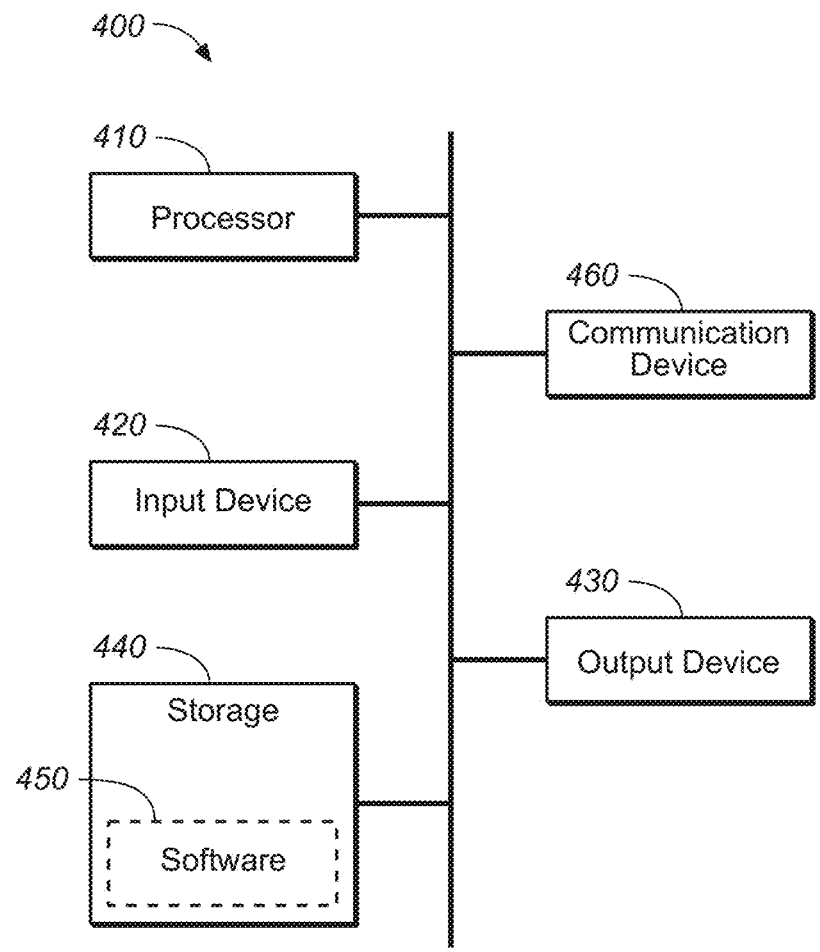
FIG. 4 illustrates a computing device, according to some embodiments.

FIG. 4 illustrates an example of a computer, according to some embodiments. Computer 400 can be a component of an automated flowchart generation and display system according to the systems and methods described above, such as system 100 of FIG. 1, or can include the entire system itself. In some embodiments, computer 400 may execute a method for generating flowchart data and displaying the generated flowchart data on a presentation slide.

Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A system for generating digital flowcharts, the system comprising:
a display;
one or more processors; and
memory storing computer program code executable by the one or more processors to cause the system to:
receive sketch image data comprising a plurality of shapes and text;
process the sketch image data to generate flowchart data, wherein processing the sketch image data comprises:
applying a first model configured to generate shape data based on the sketch image data, wherein applying the first model to generate the shape data comprises:
detecting the presence of a shape in the sketch image data;
generating classification data indicating a predicted class of the detected shape in the sketch image data; and
generating first location data indicating a determined location of the shape;
processing the shape data to generate the flowchart data, wherein generating the flowchart data comprises generating linking data that associates the shape data with one or more other objects in the flowchart data, wherein the one or more other objects comprise an arrow shape object and a text object;

wherein generating linking data that associates the shape data with the arrow shape object comprises:
calculating a minimum distance between the determined location of the shape and a location of a portion of the arrow shape object;
determining that the minimum distance is less than or equal to a predetermined threshold distance; and
in accordance with determining that the minimum distance is less than or equal to the predetermined threshold distance, generating the linking data that associates the shape data with the arrow shape object;
wherein generating linking data that associates the shape data with the text object comprises:
determining that a bounding box of the shape overlaps a bounding box of the text object;
in accordance with determining that the bounding box of the shape overlaps the bounding box of the text object, generating the linking data that associates the shape data with the text object;
wherein generating the flowchart data comprises, in accordance with generating the linking data that associates the shape data with the text object, modifying center coordinates of the text bounding box to match center coordinates of the shape bounding box; and
generate and display, on the display, a visualization of the flowchart data.

2. The system of claim 1, wherein receiving the sketch image data comprises receiving a user input indicating selection of the sketch image data from among a plurality of sketches uploaded to the system.

3. The system of claim 1, wherein processing the sketch image data further comprises one or more of:
cropping the sketch image data;
rotating the sketch image data; and
resizing the sketch image data.

4. The system of claim 1, wherein the first model comprises one or more models selected from: a R-CNN model, a Faster-RCNN model, and a YOLO model.

5. The system of claim 1, wherein predicting the class of the detected shape in the sketch image data comprises applying a classification algorithm to select the class from a predetermined set of classes.

6. The system of claim 5, wherein the predetermined set of classes comprises two or more of arrow, line, rectangle, ellipse, diamond, and parallelogram.

7. The system of claim 1, wherein the first location data comprises one or more of shape center coordinates, shape width, and shape height.

8. The system of claim 7, wherein the first location data comprises a shape bounding box comprising four corner coordinates.

9. The system of claim 8, wherein processing the shape data to generate the flowchart data further comprises:
defining a plurality of regions for a presentation page;
mapping the shape to one of the regions of the plurality of regions based on the center coordinates of the shape bounding box; and
generating modified first location data based on region location data associated with the one of the regions.

10. The system of claim 9, wherein the one or more other objects are associated with second location data.

11. The system of claim 10, wherein generating the linking data comprises generating data that associates the shape with the one or more other objects based on the modified first location data and the second location data.

12. The system of claim 10, wherein the one or more other objects comprises an arrow and the second location data indicates a location of one or more of an endpoint of the arrow and a header of the arrow.

13. The system of claim 1, wherein:
the one or more other objects comprises a text object;
processing the sketch image data further comprises:
applying a second model configured to generate text data based on the sketch image data, wherein applying the second model to generate the text data comprises:
detecting the presence of text in the sketch image data; and
generating third location data indicating a determined location of the text; and
generating the flowchart data is further based on processing the text data and generating the linking data such that the linking data associates the shape data with the text data.

14. The system of claim 13, wherein the second model comprises one or more optical character recognition models selected from: a CNN model, a RNN model, and Attention Networks.

15. The system of claim 13, wherein the third location data comprises a text bounding box comprising four corner coordinates.

16. The system of claim 13, wherein the memory storing computer program code executable by the one or more processors is further configured to cause the system to generate and display, on the display:
a visualization of the generated text data, and
an editor interface configured to allow a user to modify the generated text.

17. The system of claim 1, wherein displaying the visualization of the flowchart data comprises displaying the visualization of the flowchart data overlaid with the sketch image.

18. The system of claim 1, wherein the memory storing computer program code executable by the one or more processors is further configured to cause the system to:
receive a first user input comprising an instruction to modify the flowchart data;
in response to receiving the first user input, modify the flowchart data; and
update display of the visualization of the flowchart based on the modified flowchart data.

19. The system of claim 1, wherein the memory storing computer program code executable by the one or more processors is further configured to cause the system to interface with one or more APIs to generate one or more of PowerPoint slides and Google Slides based on the flowchart data.

20. A method for generating digital flowcharts, the method performed at a system comprising a display, one or more processors, and memory storing computer program code executable by the one or more processors configured to cause the system to carry out the method, the method comprising:
receiving sketch image data comprising a plurality of shapes and text;
processing the sketch image data to generate flowchart data, wherein processing the sketch image data comprises:
applying a first model configured to generate shape data based on the sketch image data, wherein applying the first model to generate the shape data comprises:

detecting the presence of a shape in the sketch image data;
generating classification data indicating a predicted class of the detected shape in the sketch image data; and
generating first location data indicating a determined location of the shape; and
processing the shape data to generate the flowchart data, wherein generating the flowchart data comprises generating linking data that associates the shape data with one or more other objects in the flowchart data, wherein the one or more other objects comprise an arrow shape object and a text object;
wherein generating linking data that associates the shape data with the arrow shape object comprises:
calculating a minimum distance between the determined location of the shape and a location of a portion of the arrow shape object;
determining that the minimum distance is less than or equal to a predetermined threshold distance; and
in accordance with determining that the minimum distance is less than or equal to the predetermined threshold distance, generating the linking data that associates the shape data with the arrow shape object; and
wherein generating linking data that associates the shape data with the text object comprises:
determining that a bounding box of the shape overlaps a bounding box of the text object;
in accordance with determining that the bounding box of the shape overlaps the bounding box of the text object, generating the linking data that associates the shape data with the text object;
wherein generating the flowchart data comprises, in accordance with generating the linking data that associates the shape data with the text object, modifying center coordinates of the text bounding box to match center coordinates of the shape bounding box; and
generating and displaying, on the display, a visualization of the flowchart data.

21. A non-transitory computer-readable storage medium for generating digital flowcharts, the non-transitory computer-readable storage medium storing computer program code configured to be executed by a system comprising a display and one or more processors to cause the system to:
receive sketch image data comprising a plurality of shapes and text;
process the sketch image data to generate flowchart data, wherein processing the sketch image data comprises:
applying a first model configured to generate shape data based on the sketch image data, wherein applying the first model to generate the shape data comprises:
detecting the presence of a shape in the sketch image data;
generating classification data indicating a predicted class of the detected shape in the sketch image data; and
generating first location data indicating a determined location of the shape;
processing the shape data to generate the flowchart data, wherein generating the flowchart data comprises generating linking data that associates the shape data with one or more other objects in the flowchart data, wherein the one or more other objects comprise an arrow shape object and a text object;
wherein generating linking data that associates the shape data with the arrow shape object comprises:
calculating a minimum distance between the determined location of the shape and a location of a portion of the arrow shape object;
determining that the minimum distance is less than or equal to a predetermined threshold distance; and
in accordance with determining that the minimum distance is less than or equal to the predetermined threshold distance, generating the linking data that associates the shape data with the arrow shape object;
wherein generating linking data that associates the shape data with the text object comprises:
determining that a bounding box of the shape overlaps a bounding box of the text object;
in accordance with determining that the bounding box of the shape overlaps the bounding box of the text object, generating the linking data that associates the shape data with the text object;
wherein generating the flowchart data comprises, in accordance with generating the linking data that associates the shape data with the text object, modifying center coordinates of the text bounding box to match center coordinates of the shape bounding box; and
generate and display, on the display, a visualization of the flowchart data.

* * * * *